United States Patent Office

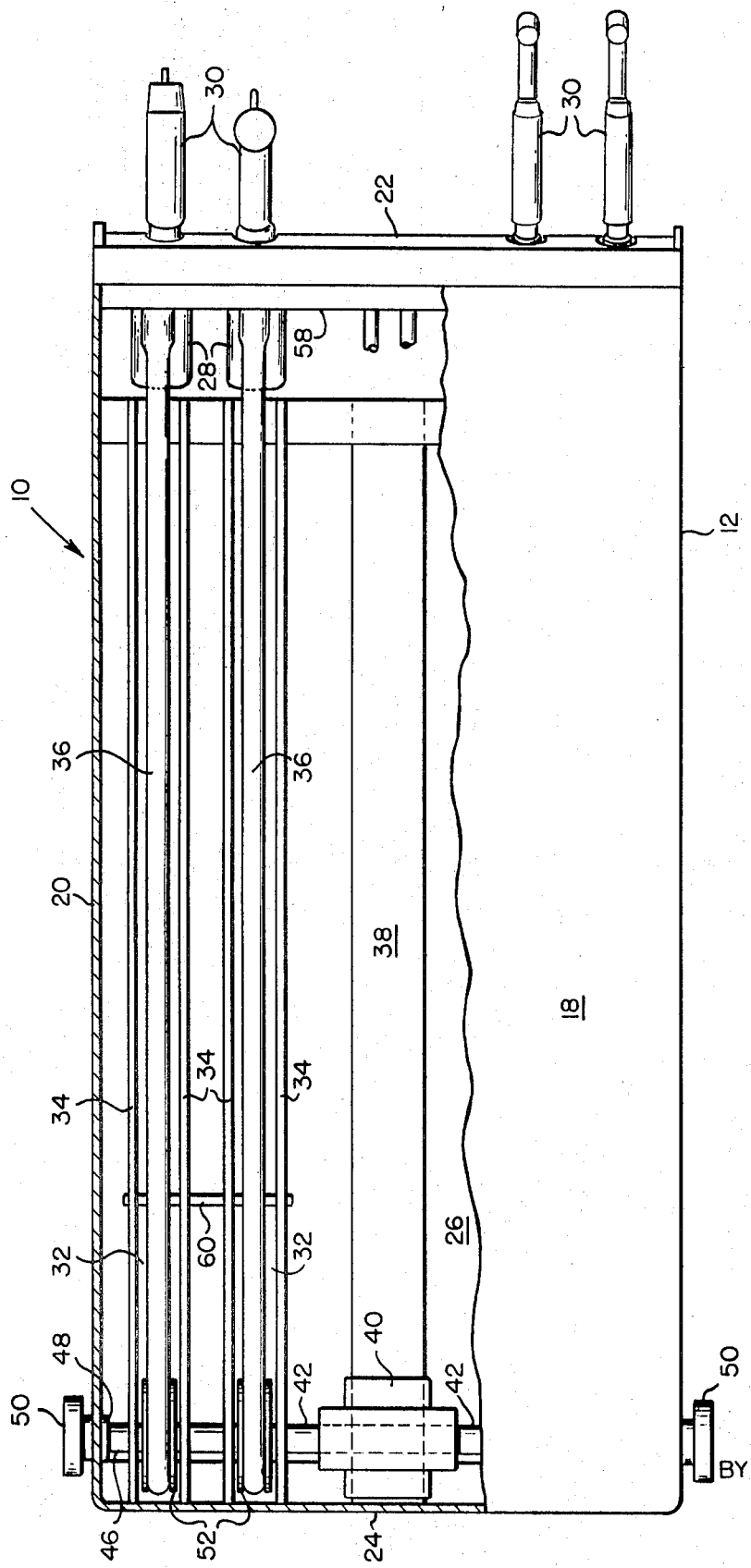

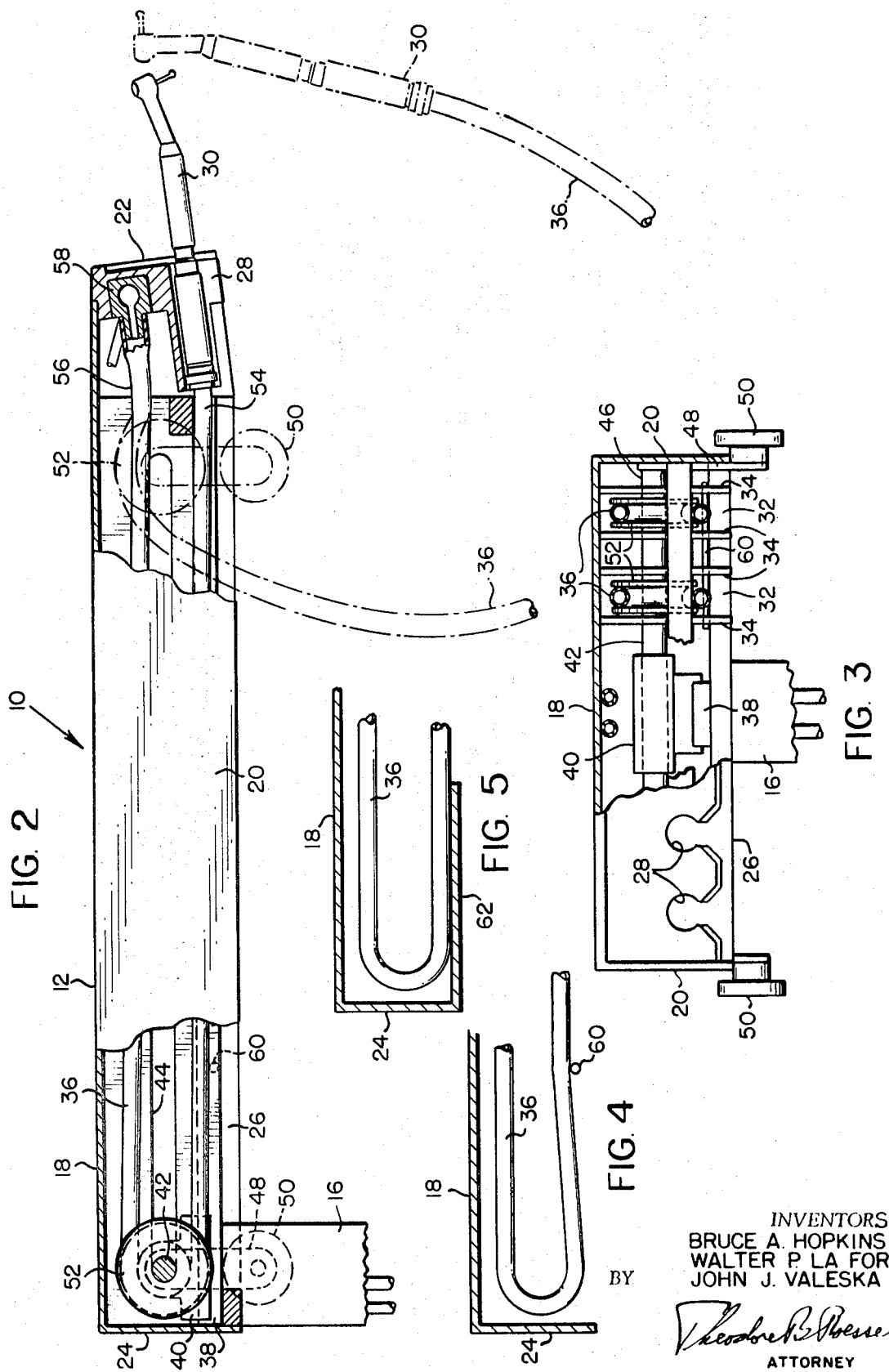

3,618,215
Patented Nov. 9, 1971

3,618,215
DENTAL EQUIPMENT STAND
Bruce A. Hopkins, West Lebanon, N.H., and Walter P. La Force, Penfield, and John J. Valeska, Rochester, N.Y., assignors to Sybron Corporation, Rochester, N.Y.
Filed May 18, 1970, Ser. No. 38,030
Int. Cl. A61c 19/02
U.S. Cl. 32—22      9 Claims

ABSTRACT OF THE DISCLOSURE

Disclosed is a dental equipment stand with a manual retraction system. The stand comprises a horizontally oriented housing having an open bottom and a slide member movable in the housing from the front to rear, the utility lines in the housing are looped about the slide for supporting the lines within the housing. Pulling on any one utility line moves the slide to the front of the housing allowing the line to sag through the open bottom. The slide is manually moved to the rear of the housing to draw the sagging portion of the lines back into the housing through the open bottom.

BACKGROUND OF THE INVENTION

The present invention relates generally to dental equipment stands and, more specifically, to a dental equipment stand which allows the operation freedom of free hanging hoses yet has a manually operated retraction system for simultaneously returning all the utility lines back into the housing after one or more of the lines have been extended from the housing for use.

Devices of the prior art are well known wherein each hose and/or utility line is associated with its own automatic retraction mechanism. With such an arrangement each line may be individually retracted back to a storage position within the stand after use. Various retraction systems employing springs and/or counterweights have been devised for such stands. With such automatic retraction systems, some locking device must also be provided in order to prevent retraction when the line is extended only to some portion of its total length. Typical devices are shown, for example, in U.S. Pats. No. 3,085,-338, 3,271,859, 3,304,609 and 3,427,719.

Some dentists do not prefer dental stands wherein each hose must be retracted back into the stand after use and instead employ dental stands having free hanging hoses. This type of dental stand has no retraction system and the hoses and utility lines simply hang freely when the instrument is returned to the stand. While such a stand permits a wider freedom of use and are simpler to operate than the type which has a retracting mechanism associated with each hose, the free hanging hoses may tangle and the sight of the hanging hoses and their associated instruments may cause anxiety in a nervous patient.

The present invention overcomes these disadvantages of the prior art by providing an inexpensive retraction system in which all the hoses and/or utility lines are freed for free hanging use only when any one is pulled from the stand and in another embodiment each hose becomes free hanging only when it is pulled from the stand. A sample retraction system which can be either manually or power operated retracts all of the free hanging hoses after use. This greatly simplifies the mechanism and eliminates the need for individual retraction systems and locking devices associated with each hose and/or utility line.

SUMMARY OF THE INVENTION

The present invention may be characterized in one aspect thereof by the provision of a generally horizontally oriented, elongated housing, the bottom of the housing being open. The housing is supported adjacent its rear and has a plurality of nests at its front for releasably supporting the dental instruments. Within the housing is a rail extending substantially front to rear, which carries a slide member. The hoses and/or utility lines connected to the dental instruments are looped around this slide so that pulling on any one instrument moves the slide to the front of the housing which allows the utility line connected to that instrument to sag or hang free through the open bottom of the housing. Moving the slide to the rear draws the sagging portion of the line into the housing through the open bottom. As all the utility lines are looped around the slide member, pulling any one utility line from the housing releases all of the remaining lines and likewise moving the slide to the rear draws all the utility lines back into the housing.

OBJECTS OF THE INVENTION

It is an object of the present invention to provide a dental stand having a retraction mechanism which is easily operated, inexpensive to manufacture and relatively maintenance free.

Another object of the present invention is to provide a dental stand wherein retraction of the utility lines is done manually.

Yet another object of the present invention is to provide a dental stand offering the operation freedom of free hanging hoses yet having the benefit of a retraction system.

A further object of the present invention is to provide a dental stand having a slide member common to all the utility lines for simultaneous retraction of all lines into the housing.

A yet further object of the present invention is to provide a dental stand wherein pulling any one instrument from the stand into use frees all the remaining instruments.

These and other objects, advantages and characterizing features of the present invention will become more apparent upon consideration of the following detailed description thereof when taken in connection with the accompanying drawings depicting the same.

DESCRIPTION OF THE DRAWINGS

FIG. 1 is a plan view of the dental stand of the present invention with the top partly broken away and showing all instruments in a retracted position;

FIG. 2 is a side elevation of FIG. 1 with the side of the dental stand partly broken away and showing in phantom line one instrument pulled from the stand;

FIG. 3 is a front elevation view of FIG. 1 partly broken away and with the instruments removed for clarity;

FIG. 4 is a schematic view of a portion of the utility line of an unused instrument; and FIG. 5 is a view similar to FIG. 4 showing another embodiment of the invention.

DESCRIPTION OF THE PREFERRED EMBODIMENTS

Referring to the drawings, FIGS. 1 and 2 show the dental stand of the present invention generally indicated at 10. The stand includes an elongated, generally horizontally oriented housing 12 which may be supported preferably adjacent its rear by any suitable means such as pivot connection 16 (FIG. 2) which allows the housing to swing in a horizontal plane. The housing is formed by a top panel 18, side panels 20 and front and rear panels 22, 24 respectively with the bottom 26 of the housing being substantially open. A plurality of nest members 28 are provided at the front of the housing, each nest being adapted to releasably support a dental instrument 30 such as drills, syringes, aspirators and the like. While the FIGS. 1 and 2 show that the instruments are exposed, it is well within the skill of the art to provide a removable covering for the instruments so that the instruments are concealed when not in use.

FIG. 1 shows that the interior of the housing is divided into a plurality of elongated channels 32 by partition members 34. Each channel runs substantially the full length of the housing and is adapted to receive a hose or utility line 36 connected to the dental instrument 30. While FIG. 1 shows this structure at only one side of the dental stand, it should be appreciated that similar structure exists beneath the portion of top panel 18 which has not been broken away.

Supported within the housing is a guiderail 38 which extends substantially the full length of the housing. The guiderail in turn supports the body of a slide member 40 which is movable on the guiderail. Extending outwardly from each side of the body of the slide member, generally normal to the guiderail, is a shaft 42. As shown in FIGS. 1 and 3 shaft member 42 extends substantially the full width of the housing and passes through an elongated slot 44 provided in each of the partition members 34 (FIG. 2). Each end 46 of the shaft is attached to a plate 48 which extends downwardly through the open bottom 26 of the housing (FIG. 3). A knob 50, attached to the lower portion of this plate, extends outwardly beyond the side panels 20 for purposes set out hereinbelow.

A plurality of pulleys 52 are carried by shaft 42 at spaced intervals with one pulley riding in each of the channels 32. The utility line in each channel is looped about the pulley with one end 54 of the line being fixed to a dental instrument (FIG. 2) and a second end 56 being attached adjacent the forward portion of the housing to a manifold 58 or other suitable source of utility supply. Thus, with the utility line looped about its associated pulley and the pulley in a storage position adjacent the rear of the housing, the utility line is supported within the housing.

In operation, the dentist or dentist's assistant merely grasps the desired instrument and pulls the instrument from its nest to the point of use. Pulling the instrument, of course, also draws a portion of the utility line from the housing. Since the utility line is looped around pulley 52, drawing the line out of the housing also moves the pulley and slide member 40 towards the front of the housing. If the dentist wishes to suspend operation with that particular instrument temporarily, he may either rest the instrument on the top 18 of the housing or return the instrument to its nest. However, the hose or utility line is not retracted into the housing when the instrument is temporarily set aside but instead sags and hangs free through the open bottom of the housing as shown in phantom in FIG. 2. If several of the instruments are used, the line attached to each will also sag through the open bottom of the housing. As shown in FIG. 2, each free hanging hose hangs with a slight rearward cant produced by the pulley and the memory of the hose for its rest position. This rearward cant allows the free hanging hose to remain back out of the way as much as possible. If necessary a coil spring (not shown) may be wound about the end 56 of the line to add stiffness and increase this rearward cant.

When the operating procedure has been complete and the dentist desires to draw the lines back into the housing, the instruments are merely nested and knob 50 pushed manually to the rear of the housing. This moves slide 40 and its associated pulleys 52 to the rear of the housing which draws the sagging portion of the lines through the open bottom and back into the housing. The partitions 34 assist in guiding the hoses back to a stored position in their respective channels 32 and prevents tangling of the lines.

It should be appreciated that if any one line is pulled from the housing with slide 40 and pulleys 52 moving to the front of the housing, all the utility lines will be released and will sag through the open bottom 26. In order to permit release of all the lines without this sagging, a pin 60 may be provided across each channel in front of each pulley 52 but below the pulley path of travel as shown, for example, in FIGS. 1 and 2. As shown schematically in FIG. 4, this pin will then support those lines not in use and will prevent the lines from sagging through open bottom 26 even when the slide and pulleys are adjacent the front of the housing. Then, pulling on the instrument merely will pull the line off of the pin and allow the line to sag through the bottom of the housing. In moving the slide to the rear, the pulleys will draw the sagging lines back into the housing and over the pins.

The support action provided by pin 60 may also be provided by extending the rear panel 24 over a portion of the open bottom to form a supporting shelf 62 as shown in FIG. 5.

Having thus described the invention, it should be appreciated that the present invention accomplishes its intended objects in providing an inexpensive, easily operated and relatively maintainence free retraction system for dental hoses and the like. The retraction system has a minimum of moving parts and the individual hoses are not biased to automatically retract the hose back into the housing thereby eliminating the need for locking mechanisms to lock the hose at any partially withdrawn position. Since there is a minimum of parts, the housing can be made in a relatively compact package to make it as unobtrusive as possible thereby minimizing any psychological fears the patient may have to the dental instrumentation.

Having thus described the invention, what is claimed as new is:

1. A dental equipment stand for supporting instruments of the type requiring a utility service, comprising:
   (a) a generally horizontally oriented, elongated housing, the bottom of said housing being substantially open;
   (b) a plurality of nests at the front of said housing for releasaby supporting said instruments;
   (c) a rail in said housing extending substantially front to rear;
   (d) a manually movable member in said housing guided by said rail, said member being movable through a path of travel between a first storage position adjacent the rear of said housing and a second in-use position adjacent the front of said housing;
   (e) utility lines stored in said housing, each of said lines having a first end fixed adjacent the front of said housing, and a second end connected to an instrument in said nest, the portion between the two ends being disposed about said movable member, said member in said first position supporting said lines within said housing and said member in said second position allowing said lines to sag and hang free through the open bottom of said housing, wherein pulling on any one of said instruments moves said member to said second position; and
   (f) means for moving said member to said first position to draw said free hanging line into said housing through said open bottom.

2. A dental equipment stand as set forth in claim 1 including a plurality of channels extending the length of said housing, one of said lines being receivable through the open bottom of said housing and into each of said channels.

3. A dental equipment stand as set forth in claim 1 in which said movable member comprises:
   (a) a body portion slidably carried by said rail;
   (b) a shaft fixed to said body portion and extending outwardly therefrom generally normal to the path of travel of said member; and (c) a plurality of pulleys provided at spaced intervals along said shaft, said pulleys each adapted to carry one of said lines.

4. A dental equipment stand as set forth in claim 3 wherein a downwardly extending plate is fixed to one end of said shaft, said plate extending through said open bottom and terminating in a hand gripped portion for moving said member.

5. A dental instrument stand for releasably supporting instruments of the type requiring a utility service, comprising:
  (a) a generally horizontally oriented, elongated housing having a top, front, rear and side panels and an open bottom;
  (b) nests at the front of said housing for releasably supporting said instruments;
  (c) utility lines in said housing each line having one end fixed to an instrument and a second fixed to a source of utility supply adjacent the front of said housing;
  (d) a rail in said housing extending substantially front to rear;
  (e) a sliding support member on said rail movable between a first position adjacent the rear of said housing and a second position adjacent the front of said housing, said sliding member being operatively connected to said utility lines, said sliding member in said first position supporting said lines in said housing and at said second position freeing said lines;
  (f) channel members in said housing extending front to rear, said channels each opening downwardly through the open bottom of said housing with one of said lines being receivable in each channel wherein moving any one of said instruments from its nest to a point of use pulls the line connected thereto and said sliding member to said second position and frees said line to sag from said channel through the open bottom of said housing; and
  (g) means for manually moving said slide to the rear of said housing for drawing said sagging line up through said open bottom and into said channel.

6. A dental instrument stand as set forth in claim 5 in which pulling on any one line to move said slide to the front of said housing releases all of said utility lines allowing each to sag from said channels through the open bottom of said housing.

7. A dental instrument stand as set forth in claim 5 in which said slide comprises:
  (a) a portion slidably mated to said rail;
  (b) a shaft extending from said portion substantially the full width of said housing said channel members having an elongated slot permitting the passage therethrough of said shaft; and
  (c) pulley on said shaft, each pulley being located in one of said channels, said utility lines receivable in said channels being disposed about said pulleys.

8. A dental console as in claim 7 including a pin extending across the opening of each channel, said pin being located between said first and second position for supporting utility lines in said channels when said sliding member is at said second position.

9. A dental console as in claim 5 including a shelf member extending across the substantially open bottom of said housing adjacent said rear panel for supporting utility lines in said channels when said sliding member is at said second position.

References Cited
UNITED STATES PATENTS

| | | | |
|---|---|---|---|
| 3,514,171 | 5/1970 | McGaha | 32—22 |
| 3,429,516 | 2/1969 | Sharp | 32—22 X |
| 3,427,719 | 2/1969 | Gordon | 32—22 |
| 3,180,585 | 4/1965 | Pusey | 32—22 X |

LOUIS G. MANCENE, Primary Examiner

J. Q. LEVER, JR., Assistant Examiner